Patented Nov. 17, 1936

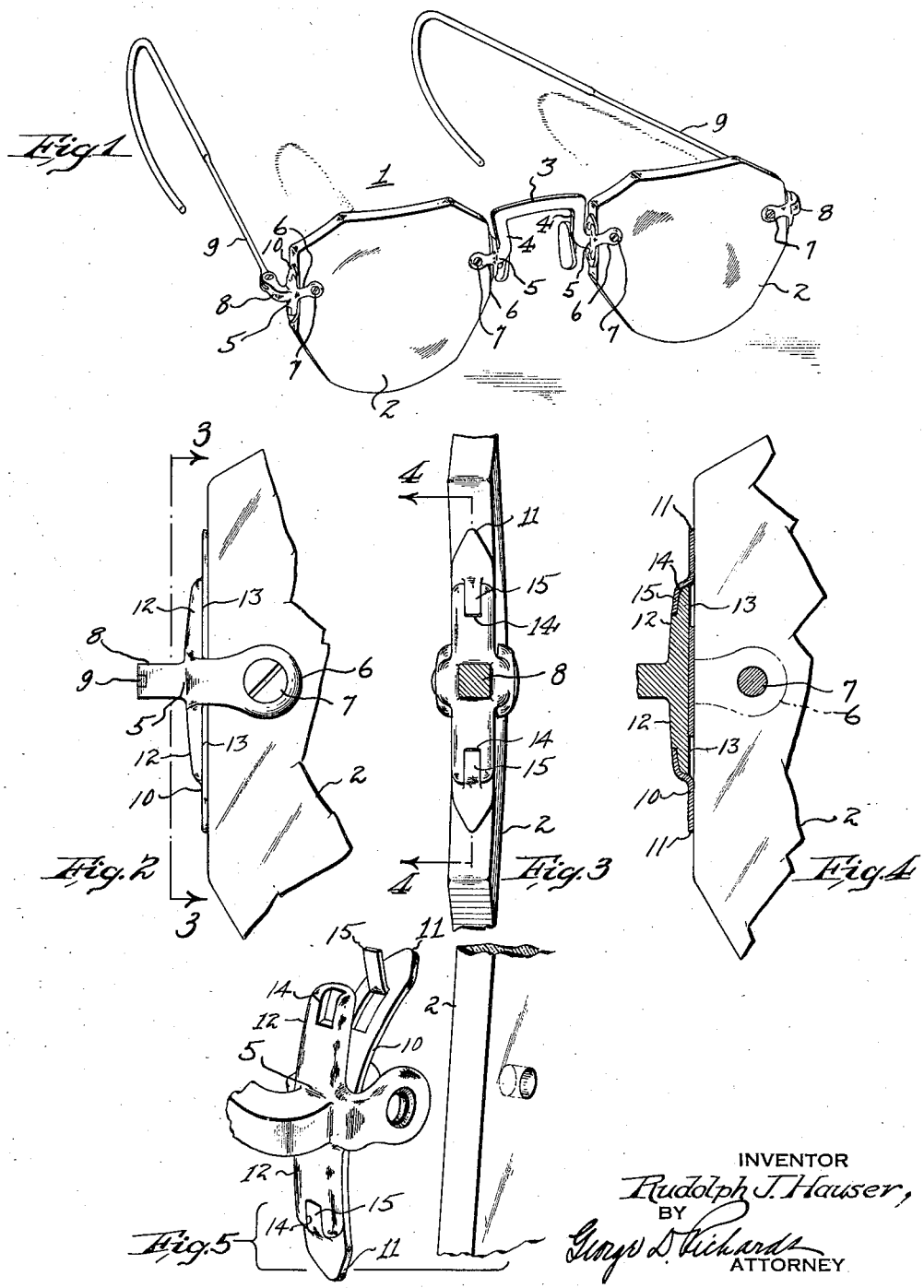

2,061,400

UNITED STATES PATENT OFFICE 2,061,400

OPHTHALMIC MOUNTING

Rudolph J. Hauser, Hillside, N. J., assignor to Lowres Optical Manufacturing Co., Newark, N. J., a corporation of New Jersey Application September 24, 1935, Serial No. 41,837

3 Claims. (Cl. 88—47)

This invention relates, generally, to ophthalmic mountings and the invention has reference, more particularly, to the provision of means for rigidly and permanently connecting the lenses of spectacles and eyeglasses to their supporting straps.

Quite generally in applying the bridge to the lenses of rimless eyeglasses, and also in attaching the temples to the lenses of spectacles, straps are used having arms which straddle opposite sides of the lenses, the said arms having holes through which a screw is inserted to extend through a hole in the glass. Usually the hole in one arm is threaded to engage the threads of the screw while the bight portion of each strap engages against the edge of the lens to prevent the mountings from turning on the screws. Considerable care and accuracy must be exercised in locating the holes with respect to the edges of the lenses in order to prevent looseness of the mountings, and yet the average optician who performs this work is not in a position to do accurate work owing to a lack of precision tools, so that ofttimes the mountings are loose or too tight, in which latter case the tightening of the screw breaks the lens. Also, the lenses of spectacles and eyeglasses tend to become loose with respect to their supporting straps which looseness is due generally to the presence of some clearance between the lenses and the bights of their straps, so that as the screws holding the strap arms together loosen or unscrew slightly with use, the lenses are freed somewhat and may move slightly with respect to their mountings, resulting in sloppy connections that are undesirable and are apt to cause the breaking of the lenses.

The principal object of the present invention is to provide an ophthalmic mounting for spectacles and eyeglasses wherein the lens strap is formed to receive and support projecting lugs provided on a leaf spring, said spring serving, by tensioning the lens strap with respect to the lens, to prevent any looseness developing in the joint between the lens strap and the lens.

Other objects of the invention, not at this time more particularly enumerated, will be clearly understood from the following detailed description of the same.

The invention is clearly ilustrated in the accompanying drawing, in which:

Fig. 1 is a perspective view of a pair of spectacles employing the novel ophthalmic mounting of the invention;

Fig. 2 is an enlarged fragmentary view in front elevation showing a portion of the structure of Fig. 1;

Fig. 3 is a sectional view of Fig. 2 taken along the line 3—3 of Fig. 2;

Fig. 4 is a fragmentary part sectional view taken along line 4—4 of Fig. 3;

Fig. 5 is a perspective view illustrating the manner of assembling the several parts of the structure.

Referring now to the several views of said drawing, the reference numeral 1 designates a pair of spectacles, having lenses 2, that are interconnected by the mounting or bridge member 3, in the usual manner. Bridge member 3 has depending arms or yokes 4 to the lower ends of which are integrally or otherwise connected lens straps 5, having perforate arms 6, for receiving fastening screws 7, that pass through apertures provided in the inner edge portions of the lenses at substantially midway of the height thereof. The outer edge portions of the lenses 2 are also perforated susbtantially midway of the height of each lens in the usual way for receiving additional fastening screws 7 that also pass through the perforate arms 6 of additional lens straps 5, that are secured to yokes 8, having the temples 9 hingedly connected thereto.

According to the principles of the present invention, the lens straps 5 are so constructed and arranged as to carry bow shaped springs 10, which, by pressing upon the edges of lenses 2, serve to prevent looseness from developing in the joints between the lenses and the lens screws as will further appear. These leaf springs preferably have somewhat pointed ends 11, and are so bent or curved as to tend to have a lesser radius of curvature than that of the end edges of the lenses 2, so that when these leaf springs are brought into engagement with the end edges of the lenses, the end portions of the springs will engage and press upon the lenses at spaced points above and below the fastening screw apertures in the lenses.

The lens straps 5 are provided with upwardly and downwardly projecting bight lugs 12, having straight inner surfaces 13 that abut the outer curved surfaces of the springs 10 and distort the latter to a substantially straight line, thereby tensioning these springs so that they press against the edges of the lenses and urge the latter firmly against the screws 7.

The free end portions of the lugs 12 are provided with substantially rectangular depressions or receiving slots 14 for receiving outstruck tongues 15 provided adjacent the ends of springs 10. The tongues 15 are struck directly out of the body of springs 10 as especially shown in Fig. 5 and are adapted to be bent around the ends of the lugs 12 and pressed into the conforming receiving recesses 14, thereby securing the springs 10 to lugs 12. The outer surface of each thusly inserted tongue 15 is flush with the surface of the lug 12 and appears in effect, as a portion of the lug, thereby presenting a neat and attractive appearance.

In assembling the leaf springs 10 with the lens straps it is merely necessary to insert the springs in between the arms 6 with the convex backs of the springs facing the lugs 12, whereupon first one tongue 15 of each spring is bent into place in a slot 14 as shown in Fig. 5 and then the remaining free end portion of the spring is pressed against lug 12 and the other tongue 15 bent into place, thereby firmly securing the spring upon the lens strap. The eyeglass fittings or mountings are now ready to be attached to the lenses, and to do this it is merely necessary to slide the edge portions of the lenses in between the arms 6 of the lens straps and then insert the screws 7 through the hole in one arm of each lens strap, through the lens aperture and then thread the screw into the aperture of the other lens strap arm, thereby tightening the lens straps upon the lenses. As thus assembled, the end and central portions of each leaf spring 10 are compressed between its supporting lens strap and the end edge of the lens as especially shown in Fig. 4, the spring thereby pressing upon the edge of the lens at points in line with the screw 7 and at points above and below the same, thereby insuring a permanently tight joint between the lens and its mounting. The resilient pressure of the leaf spring maintains the mounting rigid without allowing it to become loose or turn about the fastening screw 7 and the spring 10 also serves as a shock absorber or cushion in guarding the lens against breakage due to rough handling, etc.

Since the spring 10 is rigidly held by its tongues 15 engaging in recesses 14, this spring cannot slide up or down or become loose. The use of spring 10 allows the optician considerable leeway in locating the lens apertures, since these springs will hold the mountings tight on the lenses whether or not the bights of the lens straps abut the edges of the lenses.

In the event that the spring 10 should lose its tension or become broken in use, it is merely necessary to bend the tongues 15 upwardly out of recesses 14 somewhat, thereby permitting the defective spring to be removed, whereupon a new spring may readily be inserted in place. This operation is very simple, requires no precision tools and may be performed by anyone.

As many changes could be made in the above construction and many apparently widely different embodiments of this invention could be made without departing from the scope thereof, as defined by the following claims, it is intended that all matter contained in the above description or shown in the accompanying drawing shall be interpreted as illustrative and not in a limiting sense.

I claim:—

1. An ophthalmic mounting for spectacles and eyeglasses comprising, a lens strap having apertured arms for engaging opposite sides of a lens, a fastener for extending through said arms and an aperture in the lens, said lens strap having bight lugs extending upwardly and downwardly from the bight portion thereof between said arms, and a leaf spring attached adjacent its end portions to said respective bight lugs and abutting the bight portion of said lens strap, the end portions of said spring projecting respectively above and below the ends of said bight lugs for pressing upon the lens edge to thereby retain said mounting in fixed position on the lens.

2. An ophthalmic mounting for spectacles and eyeglasses comprising, a lens strap having apertured arms for engaging opposite sides of a lens, a fastener for extending through said arms and an aperture in the lens, said lens strap having bight lugs extending upwardly and downwardly from the bight portion thereof between said arms, the inner surfaces of said bight lugs and the bight portion of said lens strap lying in a common straight plane and providing a straight supporting surface, a normally bowed leaf spring abutting said supporting surface, securing means provided on said spring and engaging the ends of said bight lugs for holding intermediate portions of said spring flat against said supporting surface, and whereby the end portions of said spring are caused to press upon the lens at points above and below said fastener to thereby retain said mounting in fixed position on the lens.

3. An ophthalmic mounting for spectacles and eyeglasses comprising, a lens strap having apertured arms for engaging opposite sides of a lens, a fastener for extending through said arms and an aperture in the lens, said lens strap having bight lugs extending upwardly and downwardly from the bight portion thereof between said arms, the inner surfaces of said bight lugs and the bight portion of said lens strap lying in a common plane and providing a straight supporting surface, a normally bowed leaf spring abutting said supporting surface, outstruck tongues provided on said spring and engaging over the end portions of said bight lugs for holding the intermediate portion of said spring flat against said supporting surface, whereby the end portions of said spring are caused to press upon the lens at points above and below said fastener to thereby retain said mounting in fixed position on the lens.

RUDOLPH J. HAUSER.